United States Patent
Besuchet et al.

(10) Patent No.: US 10,030,960 B2
(45) Date of Patent: Jul. 24, 2018

(54) OPTICAL MEASURING PROBE CALIBRATION

(71) Applicant: Mikron Agie Charmilles AG, Nidau (CH)

(72) Inventors: Jean-Philippe Besuchet, Neuchatel (CH); Michael Monsch, Aarberg (CH)

(73) Assignee: Mikron Agie Charmilles AG (CH)

( * ) Notice: Subject to any disclaimer, the term of this patent is extended or adjusted under 35 U.S.C. 154(b) by 127 days.

(21) Appl. No.: 15/270,334

(22) Filed: Sep. 20, 2016

(65) Prior Publication Data

US 2017/0082416 A1 Mar. 23, 2017

(30) Foreign Application Priority Data

Sep. 22, 2015 (EP) ..................................... 15186221

(51) Int. Cl.
| | |
|---|---|
| *G01B 5/008* | (2006.01) |
| *G01B 5/012* | (2006.01) |
| *G01B 21/04* | (2006.01) |
| *G01B 11/00* | (2006.01) |

(52) U.S. Cl.
CPC ............. *G01B 5/012* (2013.01); *G01B 5/008* (2013.01); *G01B 11/005* (2013.01); *G01B 21/042* (2013.01)

(58) Field of Classification Search
CPC .................................................. G01B 5/012
USPC ..................................................... 33/502, 503
See application file for complete search history.

(56) References Cited

U.S. PATENT DOCUMENTS

| | | | | |
|---|---|---|---|---|
| 7,055,367 | B2 * | 6/2006 | Hajdukiewicz | G01B 21/042 33/501.02 |
| 2006/0117587 | A1 * | 6/2006 | Lotze | G01B 21/045 33/559 |
| 2008/0083127 | A1 * | 4/2008 | McMurtry | G01B 21/042 33/502 |

(Continued)

FOREIGN PATENT DOCUMENTS

| | | |
|---|---|---|
| DE | 10027106 A1 | 12/2001 |
| EP | 420416 A2 | 4/1991 |

(Continued)

OTHER PUBLICATIONS

European Search Report (in German) issued by European Patent Office (EPO) dated Nov. 24, 2015 regarding related EP Application No. 15186221.6 (7 pages).

*Primary Examiner* — G. Bradley Bennett

(74) *Attorney, Agent, or Firm* — Harness, Dickey & Pierce, P.L.C.

(57) ABSTRACT

The invention relates to a calibration device (1) and to a coordinate measuring system for measuring the signal-inducing sensing deflection $I_T$, of tactile measuring probes (2). A reference surface (8) of the reference element (7) is arranged with respect to the field of view (9) of the detector (5) in such a way that, in the event of signal-inducing contact of the sensing surface (4) of the sensing element (3) with the reference surface (8), the sensing surface (4) or parts of the sensing surface (4) lies or lie in the field of view (9) of the detector (5), the detector (5) and the calculation unit (6) being able to calculate the precise position of the sensing element (3) from the detected part of the sensing surface (4).

12 Claims, 3 Drawing Sheets

(56) References Cited

U.S. PATENT DOCUMENTS

| | | | | |
|---|---|---|---|---|
| 2009/0090013 A1* | 4/2009 | Hicks | ............... | G01B 21/042 33/502 |
| 2009/0271996 A1* | 11/2009 | Ferrari | ............ | G01B 21/042 33/502 |
| 2009/0307915 A1* | 12/2009 | Sutherland | ....... | G01B 21/042 33/502 |
| 2010/0018069 A1* | 1/2010 | Ould | ............... | G01B 21/042 33/503 |
| 2011/0107611 A1* | 5/2011 | Desforges | .......... | B25J 9/1692 33/502 |
| 2014/0096405 A1* | 4/2014 | Lee | ................... | G01B 21/10 33/502 |
| 2015/0254336 A1 | 9/2015 | Besuchet et al. | | |
| 2016/0146589 A1* | 5/2016 | Jonas | ............... | G01B 21/045 33/503 |

FOREIGN PATENT DOCUMENTS

| | | |
|---|---|---|
| EP | 965816 A2 | 12/1999 |
| EP | 2203273 B1 | 6/2012 |
| WO | WO-9408205 A1 | 4/1994 |
| WO | WO-9857121 A1 | 12/1998 |

\* cited by examiner

OPTICAL MEASURING PROBE CALIBRATION

CROSS-REFERENCE TO RELATED APPLICATION

This application claims the benefit and priority of European Patent Application No. 15 186 221.6 filed Sep. 22, 2015. The entire disclosure of the above application is incorporated herein by reference.

BACKGROUND OF THE INVENTION

Technical Field

The present invention relates to a calibration device for a measuring probe, to a coordinate measuring system equipped therewith, and to a measurement method for the coordinate measuring system.

Discussion

Calibration devices for tactile measuring probes, as well as the measuring probes themselves, are known. In machine tools, the use of measuring probes serves, for example, to accurately determine or measure the position, and optionally also the orientation, of workpieces clamped on the tool table. This ensures that the machine tool control, for example of a CNC machine, on the one hand processes, for example mills, clamped workpieces accurately according to specification, and on the other hand prevents the tool, for example the milling head, from being inadvertently driven into the workpiece and thereby damaging the machine tool. The tactile measuring probes for the position determination are generally installed in machine tools only when required, for example in order to measure the clamped workpiece on the working table of the machine tool. The measuring probe is in this case part of a coordinate measuring system which is generally connected to the machine control of the machine tool and communicates measurement points detected by the measuring probe to the machine tool. To this end, in the normal case the measuring probe is clamped at its base in the chuck of the mobile machine head, i.e. instead of a workpiece. This ensures that the measurements are carried out in direct relation to the tool head of the machine tool. At its other end, the tactile measuring probe has a deflectable sensing element, which is usually configured in the shape of a sphere or spherical cap. The sensing element has an accurately defined sensing surface which, for a position measurement, needs to come in contact—pointwise—with the object to be measured. So that damage-free contact of the sensing element on the measuring probe with the object to be measured can be performed at all, the measuring probe is equipped with an electromechanical sensor. This sensor operates like a small spring element. In the event of contact of the deflectable sensing element on the tip of the measuring probe with an object, the measuring probe is compressed—resiliently and reversibly—along its longitudinal axis by a sensing deflection I. Once this sensing deflection reaches a determined threshold value $I_{Tr}$ (trigger value, for example in the range of 4-30 μm) then the measuring probe, or its sensor, triggers an electrical signal which signals contact, or compression, of the measuring probe and, for example, prevents further movement of the machine head. Since the geometry of the measuring probe—in particular the geometry of the sensing surface on its sensing element and the length of the measuring probe—are accurately defined and known after calibration on the machine tool, the relative position of a measured point—for example on the clamped workpiece—can be accurately determined, and for example detected by the machine control of the machine tool, on the basis of the position, known to the machine control, of the tool head or of the chuck. Since machine tools are now highly precise, the sensing deflection $I_{Tr}$ of the measuring probe also needs to be taken into account in this position determination. This is done during the calibration of the tactile measuring probe.

For an accurate position measurement with a measuring probe, for example, Document WO 98/57121 proposes to record the position of the sensing element on the measuring probe directly with an optical sensor, so that a sensing deflection or otherwise occurring deformations of the generally pin-shaped measuring probe cannot interfere with the position measurement.

Such a device, however, has not always proven reliable in practice because in certain cases—for example in the event of contamination—the optical sensor cannot in fact detect the sensing element correctly. The device is furthermore relatively complex because it is necessary to move the measuring probe and the additional optical sensor with the measuring probe. Furthermore, there are applications in which the sensing element cannot be kept in the region of view of the optical sensor during a measurement. If the intention is to measure the depth of a bore, for example, the optical sensor cannot detect the sensing element inserted into the bore, and consequently cannot carry out a measurement. The usability of such a measuring device is therefore relatively limited.

WO 94/08205 describes a similar device, in which the mechanical sensing element is moved by means of a video camera to the position to be measured.

A further calibration device for mobile devices is described in DE 10027106-A1.

EP 2203273-B1 in the name of the company Conoptica discloses a measuring device with which rotating tools can be measured. In its paragraphs [105] to [107], however, the document here also describes the possibility of measuring the above-described tactile measuring probes with the same measuring device. To this end, measuring probes are clamped in the chuck of the tool head and measured in a measuring device, positioned for example next to the machine table (see paragraph [106] and FIGS. 6a and 7a). To this end, the measuring device has an optical detector and a pneumatic rod, on which a glass cube having a reference pattern is fastened. The glass cube is initially brought into the field of view of the optical detector. The detector can detect the precise position of the glass cube, or of its surface, with the aid of the reference pattern applied on the glass cube. Subsequently, the tool head moves the tip of the measuring probe against the glass cube until the tactile measuring probe signals contact and stops further movement of the machine head. On the basis of the known position of the base of the measuring probe in the chuck and of the touched reference surface on the glass cube, the measuring device can determine both the length of the measuring probe in the triggered or touched state and the actual sensing deflection $I_{Tr}$ of the measuring probe, and therefore calibrate the measuring probe.

If the measuring probe is fitted in the tool head again at a later time, then the calibration can be carried out more rapidly. To this end, the spherical tip of the measuring probe is brought into the field of view of the optical detector again, and the position or the coordinates of the spherical tip are determined optically and compensated with the stored sensing deflection $I_{Tr}$ of the measuring probe. This gives the effective position which the spherical tip occupies in the triggered state, i.e. the state of touching a measurement point. The newly fitted measuring probe is therefore already calibrated and ready for new position measurements.

Although the measuring device of EP 2203273-B1 gives good measurement results, the use of the glass cube for the sensing deflection measurement $I_{Tr}$ is very elaborate in practical use and consequently needs improvement since, for the sensing deflection measurement $I_{Tr}$, the glass cube additionally needs to be provided with a transparent glass platelet and frozen (in order to produce the reference pattern, see the end of paragraph [107]). Furthermore, the glass cube and its reference surface (which touches the measuring probe) need to be produced with high precision so that it allows a very precise measurement. The design is consequently relatively complex and therefore expensive.

SUMMARY OF THE INVENTION

An aspect of the present invention is therefore to provide a calibration device for measuring the signal-inducing sensing deflection $I_{Tr}$ of tactile measuring probes, which eliminates the disadvantages of the existing devices and, in particular, has a simpler design.

An advantage of the calibration device according to the invention is that neither the reference element nor its reference surface needs to be manufactured or positioned with high precision. The reference surface does not actually need to lie in the field of view of the detector. It is merely used to deflect the sensing element and is not—in contrast to the known devices of the prior art—needed for the position determination. The detector of the calibration device merely needs to be able to detect a part of the sensing surface of the deflected sensing element of the measuring probe so that, together with the calculation unit, it can calculate the precise position of the sensing element. The detector may, for example, be a camera-based or even commercially available laser-based tool measuring instrument (for example from the manufacturer Blum Novotec, Renishaw or Hexagon M&H). The calibration is merely carried out with the aid of the position detection of the sensing element—which is deflected by the amount $I_{Tr}$ during use. Highly precisely manufactured or highly precisely positioned reference objects (such as surfaces or glass cubes) are therefore not required. The position of the reference surface does not even need to be determined precisely. So long as the detector detects a part of the sensing surface (in the loaded or unloaded position), the position of the sensing element can be determined precisely. The calibration device according to the invention is constructed relatively simply and can consequently be produced more favourably, but above all it is substantially simpler to use.

For the variant with, for example, a laser-based detector, it is preferable to use a measuring probe having a laser-measurable sensing surface (for example made of ceramic instead of the conventional sapphire glass).

BRIEF DESCRIPTION OF THE DRAWINGS

The device according to the invention will now be explained below with the aid of schematic figures and examples, in which.

DETAILED DESCRIPTION OF THE PREFERRED EMBODIMENTS

Figure 1:
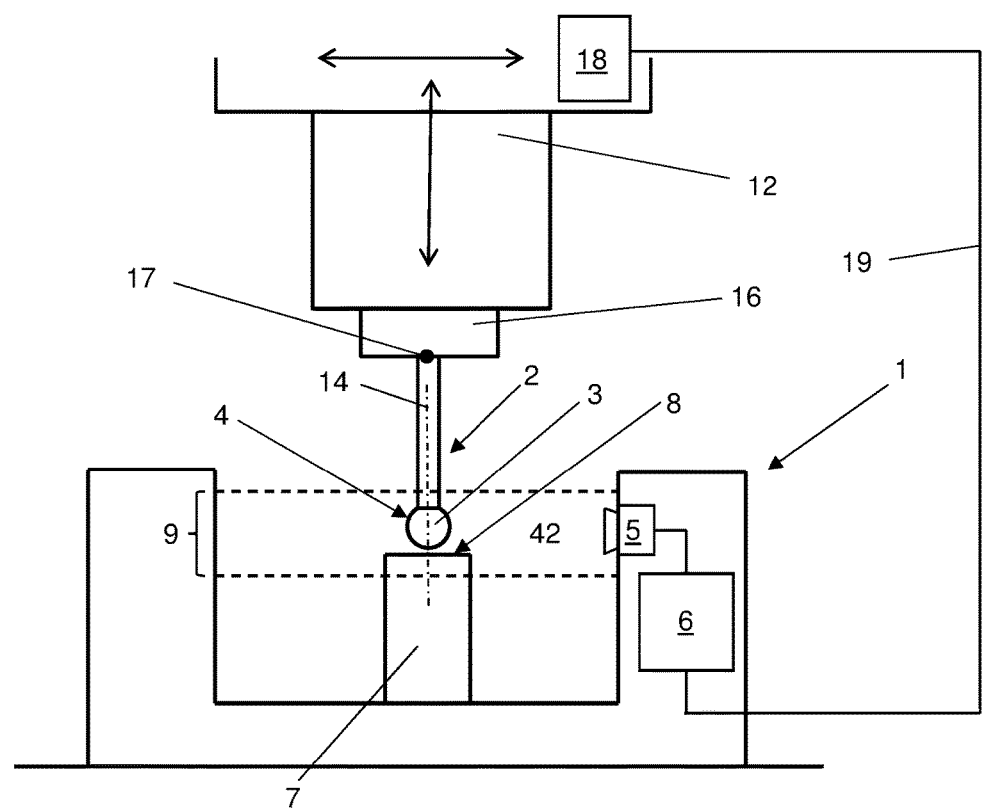
FIG. 1 shows an example of a calibration device according to the invention.

In order to measure the sensing deflection $I_{Tr}$, the calibration device according to the invention is installed together with a tactile measuring probe as a coordinate measuring system in a machine tool, and is connected to the machine tool control. Such an arrangement is shown in FIG. 1. The tactile measuring probe (2) is initially clamped in the chuck (16) of the mobile tool head (12). In a first step, the tool head (12) is moved toward the calibration device (1) according to the invention, so that the deflectable sensing element (3), or the tip of the tactile measuring probe (2) enters the field of view (9) of the detector (5) without touching another object (for example the reference surface 8). In this case, it is sufficient even for only a part of the sensing surface (4) of the sensing element (3) to be positioned in the field of view (9) of the detector (5). The detector (5) and the calculation unit (6) of the calibration device (1) can determine the precise position of the deflectable sensing element (3) therefrom. Since the coordinate measuring system is connected to the machine tool control (18) via the line (19), the calculation unit (6) of the calibration device (1) can call up the position (coordinates) of the clamping point (17) of the tactile measuring probe (2) in the chuck (16) of the tool head and, together with the determined position (or the coordinates thereof) of the sensing element (3), determine the precise length and size of the clamped measuring probe (2). The calculation unit in this case naturally also takes into account the size of the actual sensing element (3) (in the normal case the radius of the spherical-cap-shaped sensing element).

Figure 2:
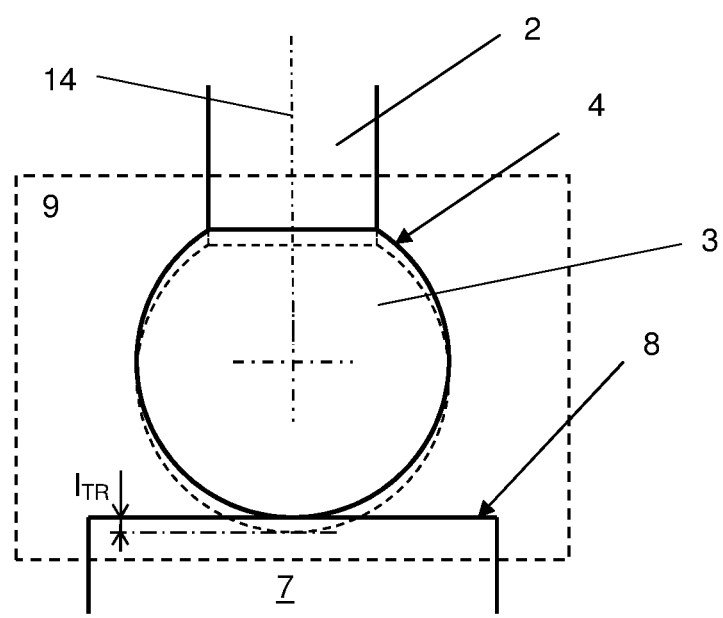
FIG. 2 shows a detailed view of a tactile measuring probe.

After the size or length of the clamped measuring probe (2) has in the unloaded state (i.e. without deflection of the sensing element) thereby been determined, the actual sensing deflection $I_{Tr}$ of the sensing element (3) is measured for the calibration. See the detailed view in FIG. 2 in this respect. The tactile measuring probe (2) has an electromechanical sensor (not represented) which reacts to the deflection of the sensing element (3), or emits a signal to signal that contact with an object has taken place (the signal may for example be electrical, optical or an infrared signal). The actual deflection of the sensing element (3) is normally carried out at the base of the measuring probe (2) (at the clamping point (17) of the measuring probe (2)), where the electromechanical sensor (not represented) is also located. The signal, however, is not initiated by the sensor until the sensing element (3) has experienced a particular deflection $I_{Tr}$ (compare with the dashed representation of the original position of the sensing element (3)). For the measurement of the sensing deflection $I_{Tr}$, the measuring probe (2) with the deflectable sensing element (3) is moved by slow movement of the tool head (12) in the direction of the reference surface (8) until the measuring probe (2), or its sensor, signals contact of the sensing element (3) with the reference surface (8) to the calibration device (1) or to the coordinate measuring system and this device or system sends a stop signal to the machine control so that any further movement of the tactile measuring probe (2) is prevented. The sensing element (3) is therefore deflected in the direction of the longitudinal axis (14) by the sensing deflection $I_{Tr}$, and in this state the sensing deflection $I_{Tr}$ of the sensing element (2) can now be measured (with the detector (5)). Again, it is sufficient for only a relevant part of the sensing surface (4)

of the sensing element (3) to be positioned in the field of view (9) of the detector (5). The detector (5) and the calculation unit (6) determine therefrom the precise position, or coordinates, of the sensing element (3) deflected by the amount $I_{Tr}$. The position (or coordinates) of the clamping point (17) of the tactile measuring probe (2) in the chuck (16) of the tool head (12) is then called up again and the length of the measuring probe (2) with a signal-inducing sensing deflection $I_{Tr}$ is calculated therefrom. From the difference between the two measured measuring probe lengths, the calibration device (1) according to the invention, or the coordinate measuring system, determines the value of the sensing deflection $I_{Tr}$ and stores this value (for example in the calculation unit) and/or communicates it to the machine control. The calibration of the sensing deflection $I_{Tr}$ of the measuring probe (2) is therefore concluded. In FIG. 2, the dashed lines moreover represent the sensing element (3), or the measuring probe (2), in the resting position, i.e. in the undeflected position.

During the subsequent coordinate determination of measurement points, for example on the clamped workpiece, the measured sensing deflection $I_{Tr}$ is always taken into account.

The sensing deflection, or calibration, should be carried out individually for each measuring probe since the value $I_{Tr}$ may be different for each tactile measuring probe. The sensing deflection $I_{Tr}$ remains unchanged during normal use for each measuring probe and only needs to be checked periodically.

If the measuring probe (2) is clamped again in the chuck (17) of the tool head (12), it is however recommendable to repeat the first step mentioned above, i.e. to recalibrate the position of the deflectable sensing element (3). Reasons for this are: the measuring probe (2) might no longer have exactly the same position in the chuck (16) as during the first calibration, or the measuring probe (2)—or the machine tool—are at a slightly different temperature than during the original calibration. Since the sensing deflection $I_{Tr}$ is a very small value, its magnitude remains practically the same even in the event of a modified measuring probe or machine temperature.

Figure 3:
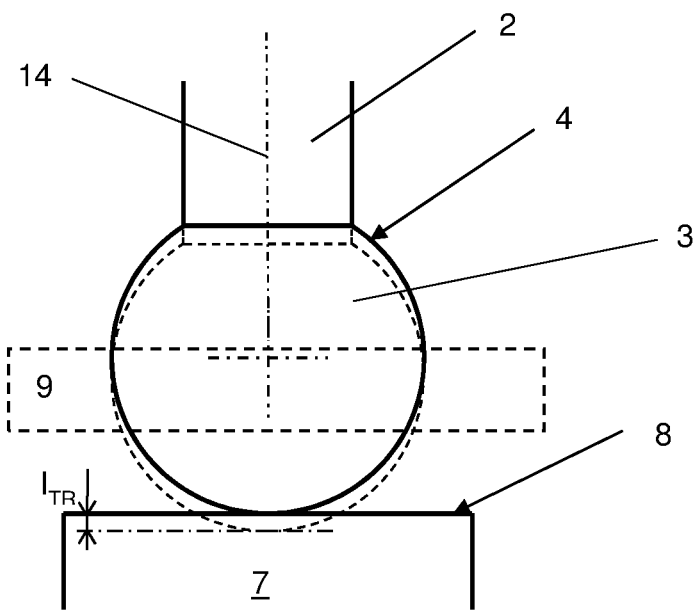
FIG. 3 shows the tactile measuring probe of FIG. 2 with a smaller detector field of view.

FIG. 3 shows the same tactile measuring probe (2) from the preceding FIG. 2. As can be seen from FIG. 3, however, the field of view (9) of the detector does not acquire the entire sensing element (3), but only a part of its sensing surface (4). Even only a part of the sensing element (3) is sufficient for the calibration device according to the invention in order to determine the precise position of the sensing element (3). This is advantageous, in particular, because neither the reference element (7) nor its reference surface (8) therefore need to be defined or positioned with maximal precision. In this case, the reference surface (8) may even be defined inaccurately (for example in a nonplanar or rough fashion). That is to say, in contrast to the prior art, the deflected sensing element (3) does not need to be placed in a fully determined position in order for the sensing deflection $I_{Tr}$ of the measuring probe to be measurable correctly. For the device according to the invention, it is sufficient as a requirement that the reference surface (8) is positioned close enough to the field of view (9) of the detector for at least a part of the sensing surface (4) to be placed in the field of view (9) of the detector in the event of signal-inducing contact.

Figure 4:
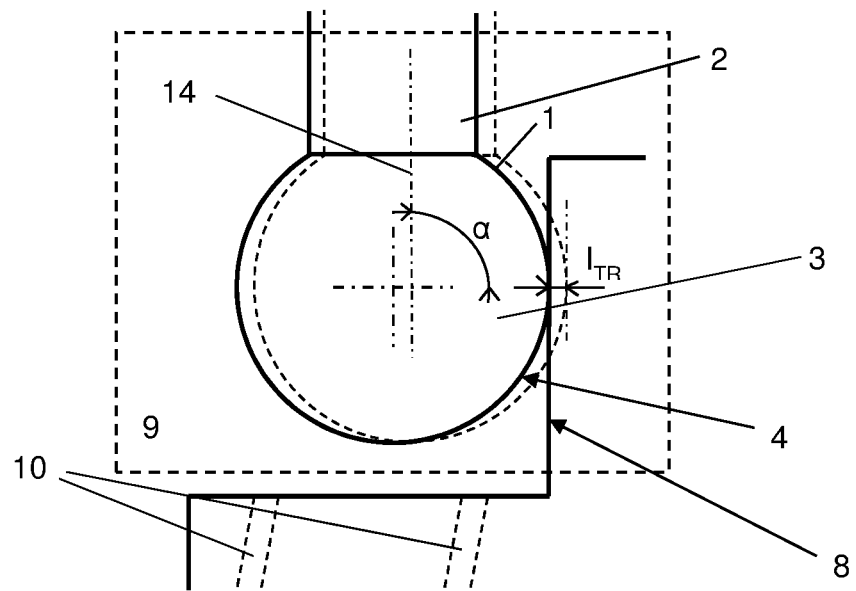
FIG. 4 shows a tactile measuring probe with a lateral deflection of the sensing element.

FIG. 4 shows another conceivable embodiment of the calibration device according to the invention, in which a tactile measuring probe (2) can be deflected and calibrated not only in its longitudinal direction (14), but also perpendicularly thereto. This embodiment naturally presupposes that not only the measuring probe (2) but also the calibration device is configured accordingly. As represented by the figure, in this case a sensing deflection $I_{Tr}$ is measured which takes place laterally or perpendicularly with respect to the longitudinal axis (14) of the measuring probe (2).

Of course, according to the present invention it is also conceivable for a measuring probe, and its sensing element, to be deflectable in combination both in the direction of the longitudinal axis (14) and perpendicularly thereto (according to FIG. 4). The measurement with the measuring probe can therefore also be carried out in an arbitrarily inclined direction with respect to the surface to be measured. The angle a indicated in FIG. 4 may therefore have a value other than 90°. Preferably, the angle a has a value of from 90° to 180°.

In order to avoid contamination, in another preferred embodiment the reference surface (8) may be equipped with nozzles (10) which clean the reference surface itself or the sensing element with compressed air or a cleaning fluid before a further measurement.

The invention therefore relates to a calibration device, as well as a coordinate measuring system having the calibration device, and an associated measurement method for measuring the signal-inducing sensing deflection $I_{Tr}$ of tactile measuring probes. The tactile measuring probe comprises a deflectable sensing element having a sensing surface. The deflectable sensing element is for example configured in the shape of a sphere or spherical cap, and is fastened on a pin. Usually, the sensing element can be deflected together with the pin on the base, i.e. the foot of the measuring probe. The calibration device furthermore comprises a detector, preferably a camera or a laser measuring instrument. The detector has a field of view which is intended for acquiring the sensing surface of the sensing element. Furthermore, the device according to the invention comprises a reference element having a reference surface, and a calculation unit. According to the invention, the reference surface of the reference element is arranged with respect to the field of view of the detector in such a way that, in the event of signal-inducing contact of the sensing surface of the sensing element with the reference surface—i.e. the contact-sensitive sensor emits a corresponding signal—the sensing surface or parts of the sensing surface lies or lie in the field of view of the detector. Since the measuring probe and its sensing elements have predetermined and known sizes, the reference surface and the field of view can be positioned straightforwardly with respect to one another. The detector is connected to a calculation unit of the calibration device so that the precise position of the sensing element can be calculated from the detected part of the sensing surface. It would also be conceivable for a calculation unit to be integrated in the detector and calculate the position directly. It would also be conceivable for the calibration device to be connected to the machine control and for the machine control to calculate the position of the sensing element. The function of the calculation unit may therefore also be undertaken by other elements, for example outside the calibration device.

Because the detector determines the position of the sensing element with the aid of a part of the detected sensing surface, the reference element or its reference surface may lie inside, or alternatively outside, the detection region or field of view of the detector.

Preferably, the reference element is equipped with one or more nozzles which are used for cleaning. Preferably, the nozzles are oriented towards the reference surface. For cleaning, the nozzles are supplied with compressed air or a cleaning fluid. The nozzles may be oriented in such a way that they clean the reference surface and/or the surface of the sensing element. The sensing element, or the sensing surface thereof, may be configured in the shape of a sphere or spherical cap.

According to another preferred embodiment, in addition, the calibration device may also detect and calculate the position of tools, in particular milling tools. In this case, the detector detects the surface or contours of the tool and determines its precise position therefrom.

The invention comprises not only the calibration device per se but also a coordinate measuring system equipped therewith for machine tools. The coordinate measuring system comprises a calibration device according to the invention and a tactile measuring probe, which has a deflectable sensing element and is clamped on a tool head of the machine tool.

In another variant of the invention, the measuring probe may be structured in such a way that the signal-inducing sensing deflection $I_{Tr}$ of the sensing element can take place in different directions with respect to the longitudinal axis of the measuring probe. Thus, the sensing deflection may take place parallel or flush with the measuring probe longitudinal axis, at a right angle (perpendicularly) thereto, or in any direction inclined by an angle a with respect to the measuring probe longitudinal axis.

Furthermore, the sensing element may be deflectable by compression or traction. The calculation unit provided can calculate the signal-inducing sensing deflection $I_{Tr}$ of the sensing element with the aid of the position of the sensing element, determined by the detector, and the position of the tool head.

The invention also relates to a measurement method according to the invention for measuring the signal-inducing sensing deflection $I_{Tr}$ of the measuring probe. To this end, the sensing element of the measuring probe is initially brought in contact with the reference surface of the reference element in such a way that the contact signal is initiated. In a further step, the coordinate measuring system subsequently determines the sensing deflection $I_{Tr}$ of the measuring probe with the aid of the previously known length of the measuring probe and from the position of the clamping point of the measuring probe on the tool head and the position of the sensing element, determined by the detector and the calculation unit of the calibration device. The length of the measuring probe is preferably measured before the actual measurement of the sensing deflection, or is entered into the calculation unit of the calibration device.

If the length of the measuring probe is measured, then before the measurement of the signal-inducing sensing deflection $I_{Tr}$, the length of the measuring probe may be determined as follows: the sensing surface or parts of the sensing surface of the sensing element are brought into the field of view of the detector, without the sensing element touching other objects in the process. The detector and the calculation unit calculate the precise position of the sensing element from the detected part of the sensing surface. Subsequently, the calculation unit determines the length of the measuring probe with the aid of the detected position of the sensing element and the position of the clamping point of the measuring probe on the tool head of the machine tool. The position, or the coordinates, of the clamping point of the measuring probe on the tool head of the machine tool are communicated electronically to the calculation unit, for example by the machine control of the machine tool. The calculation unit is therefore preferably connected to the machine tool control.

In a particularly preferred variant of the measurement method according to the invention, the position of the deflectable sensing element is respectively calibrated or measured in again when the measuring probe is reclamped in the chuck of the tool head for a new measurement. This increases the precision of the subsequent measurements. In this case, the position of the deflectable sensing element is detected again in the event of reclamping of the measuring probe in the tool head. For the subsequent position measurements, the coordinate measuring system then accesses the already measured and stored sensing deflection $I_{Tr}$.

The invention also comprises a machine tool, in particular milling machine or electrical discharge machine, having a coordinate measuring system functioning according to the invention or a calibration device according to the invention.

The present invention is not restricted to the possibilities and embodiments explicitly mentioned. Rather, these variants are intended as a suggestion to the person skilled in the art in order to implement the concept of the invention as favourably as possible.

What is claimed is:

1. A calibration device (1) for measuring the signal-inducing sensing deflection $I_{Tr}$ of tactile measuring probes (2) which have a deflectable sensing element (3) having a sensing surface (4), the calibration device (1) comprising a detector (5), preferably a camera or a laser measuring instrument, having a field of view (9) for detecting the sensing surface (4) of the sensing element (3), a reference element (7) having a reference surface (8), and a calculation unit (6), wherein the reference surface (8) of the reference element (7) is arranged with respect to the field of view (9) of the detector (5) in such a way that, in the event of signal-inducing contact of the sensing surface (4) of the sensing element (3) with the reference surface (8), the sensing surface (4) or parts of the sensing surface (4) lies or lie in the field of view (9) of the detector (5), the detector (5) and the calculation unit (6) being configured to calculate the precise position of the sensing element (3) from the detected part of the sensing surface (4).

2. A calibration device (1) according to claim 1, wherein the reference element (7), or the reference surface (8) thereof, lies inside or outside the field of view (9) of the detector (5).

3. A calibration device (1) according to claim 1, wherein the reference element (7) is equipped with one or more nozzles (10), the nozzles (10) preferably being oriented towards the reference surface (8).

4. A calibration device (1) according to claim 1 wherein the sensing element (3), or the sensing surface (4) thereof, is configured in the shape of a sphere or spherical cap.

5. A calibration device (1) according to claim 1 wherein the calibration device also detects and calculates the position of tools, in particular milling tools.

6. A coordinate measuring system (15) for machine tools (11), having a calibration device (1) according to claim 1 and having a tactile measuring probe (2), which can be clamped on the tool head (12) of the machine tool (11) and has a deflectable sensing element (3) and a sensing surface (4) assigned to the sensing element (3), it being possible for the signal-inducing sensing deflection $I_{Tr}$ of the sensing element (3) to take place in the direction of the measuring probe longitudinal axis (14), perpendicularly thereto, or in a direction inclined by an angle (α) with respect to the longitudinal axis (14).

7. A coordinate measuring system (15) for machine tools (11), having a calibration device (1), according to claim 6, wherein the sensing element (3) is deflectable by compression or traction.

8. A coordinate measuring system (15) for machine tools (11), having a calibration device (1), according to claim 6, wherein the calculation unit (6) calculates the signal-inducing sensing deflection $I_{Tr}$ of the sensing element (3) with the aid of the position of the sensing element (3), determined by the detector (5), and the position of the tool head (12).

9. A measurement method for a coordinate measuring system (15) using the device of claim 6 wherein, in order to measure the signal-inducing sensing deflection $I_{Tr}$ of the measuring probe (2), the sensing element (3) of the measuring probe (2) is initially brought in contact with the reference surface (8) of the reference element (7) in such a way that the contact signal is initiated, following which the coordinate measuring system (15) calculates the sensing deflection $I_{Tr}$ of the measuring probe (2) with the aid of the previously known length of the measuring probe (2) and from the position of the clamping point (17) of the measuring probe (2) on the tool head (12) and the position of the sensing element (3), determined by the detector (5) and the calculation unit (6) of the calibration device (1).

10. A measurement method for a coordinate measuring system (15) according to claim 9, wherein, before the measurement of the signal-inducing sensing deflection $I_{Tr}$, the length of the measuring probe (2) is determined by the sensing surface (4) or parts of the sensing surface (4) of the sensing element (3) being positioned in the field of view (9) of the detector (5), without the sensing element (3) touching other objects in the process, the detector (5) and the calculation unit (6) calculating the precise position of the sensing element (3) from the detected part of the sensing surface (4), and the calculation unit (6) calculating the length of the measuring probe (2) with the aid of this determined position of the sensing element (3) and the position of the clamping point (17) of the measuring probe (2) on the tool head (12).

11. A measurement method for a coordinate measuring system (15) according to claim 9 wherein the position of the deflectable sensing element (3) is detected again when the measuring probe (2) is reclamped in the tool head (12).

12. A machine tool (11), in particular milling machine or electrical discharge machine, having a coordinate measuring system (15) or a calibration device (1) according to claim 1.

* * * * *